No. 794,818. PATENTED JULY 18, 1905.
C. J. SMITH.
COAL MINING MACHINE.
APPLICATION FILED MAY 23, 1903.

Attest:
L. R. Heidrock
W. E. Allis

Inventor:
Clark J. Smith
By J. Sweet Atty

No. 794,818.    Patented July 18, 1905.

UNITED STATES PATENT OFFICE.

CLARK J. SMITH, OF OTTUMWA, IOWA, ASSIGNOR TO MARTIN HARDSOCG, OF OTTUMWA, IOWA.

COAL-MINING MACHINE.

SPECIFICATION forming part of Letters Patent No. 794,818, dated July 18, 1905.

Application filed May 23, 1903. Serial No. 158,419.

*To all whom it may concern:*

Be it known that I, CLARK J. SMITH, a citizen of the United States of America, and a resident of Ottumwa, Wapello county, Iowa, have invented a new and useful Coal-Mining Machine, of which the following is a specification.

The object of this invention is to provide improved means for mining coal, and relates to that type of machines employed to cut under a seam or vein of coal and permit the body to fall by gravity the depth of the space excavated thereunder.

My invention consists in the construction, arrangement, and combination of elements hereinafter set forth, pointed out in my claims, and illustrated by the accompanying drawings, in which—

Figure 1:
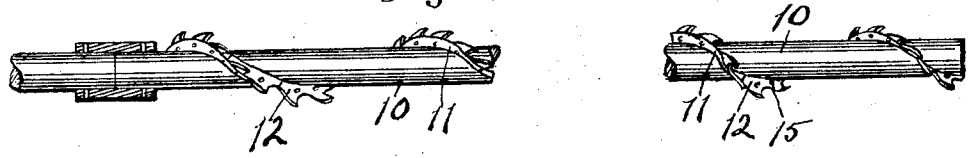
Figure 2:
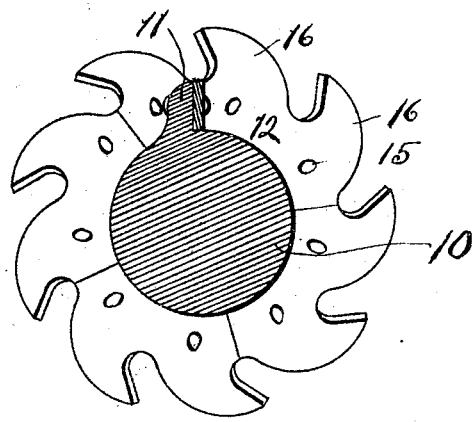
Figure 4:
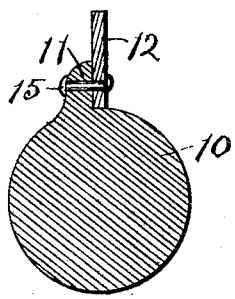
Figure 3:
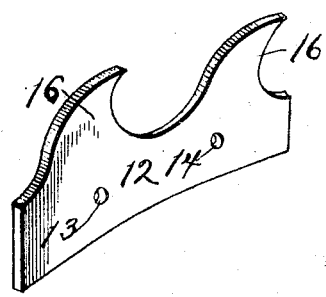

Figure 1 is a side view of the cutting mechanism, portions thereof being broken away to economize space. Fig. 2 is a cross-section of the cutting mechanism. Fig. 3 is a detail perspective of one of the cutters. Fig. 4 is a detail cross-section showing the means employed to mount one of the cutters on the screw.

In the construction of the device as shown the numeral 10 designates a cutter-bar, preferably circular in cross-section and formed as a screw, the helix of which varies in pitch from end to end, being of greater pitch at one end than at the other end. The cutter-bar 10 has a single helical flange 11 thereon, and said flange is formed with a plane face on one side. Cutters are provided and are formed in sections 12, each of which sections preferably is made of sheet metal of the desired thickness and quality and punched with holes 13 14, adapted to receive rivets 15 or bolts or screws whereby the sections may be attached to the helical flange or screw 11 of the cutter-bar 10. The sections 12 are mounted end to end and abutting in series throughout the length of the plane face of the helical flange or screw 11 of the cutter-bar 10 and conjunctively provide a continuous serrated jagged or toothed helical cutter, inasmuch as each section is formed with one or more teeth 16, (in this instance two,) which teeth project beyond the flange or screw 11. The teeth 16 of the cutter-sections preferably are hooked or formed with projecting lips extending forwardly from the stem or body portion, whereby the tooth is integrally connected to the section.

In the rotation of the cutter-bar 10 in one direction the teeth of the cutter-sections 12 thereon engage and scratch, cut, disintegrate, and remove soil, earth, and mineral substances contacted thereby, and the screw will clear away the material cut by said teeth. The pitch of the screw varies, as described and shown, in order that it may draw and convey the substances cut by the teeth more rapidly at one end than at the other.

I claim as my invention—

1. In a machine of the class described, the cutting mechanism, comprising the cutter-bar, the screw thereon and projecting wholly from the periphery of the bar and the helical sectional cutters on said screw.

2. In a machine of the class described, the cutting mechanism, comprising a cutter-bar circular in cross-section, a helical flange thereon and projecting wholly from the periphery of the bar and helical cutter-sections mounted on said helical flange.

3. In a machine of the class described, a cutting mechanism comprising a cutter-bar circular in cross-section, a helical flange thereon and projecting wholly from the periphery of the bar and helical cutter-sections mounted end to end and abutting in series on and throughout the length of said helical flange.

4. In a machine of the class described, a cutting mechanism comprising a cutter-bar, a helical flange thereon and formed with a plane face on one side, and helical cutter-sections mounted end to end on the plane face of the helical flange and fixed to said flange.

5. In a machine of the class described, a cutter-bar, a helical flange integrally formed thereon and of varying pitch from end to end and helical cutter-sections detachably mounted on said flange.

6. In a machine of the class described, a cutter-bar, a helical cutter-section formed of sheet metal and having teeth projected from one margin thereof and also formed with holes in its body portion adapted to receive fastening means for mounting said section on a cutter-bar.

7. In a machine of the class described, a cutter-bar having a helical flange, and helical cutter-sections detachably mounted on said helical flange, each of said sections formed of sheet metal with teeth projecting from one margin thereof.

8. In a machine of the class described, a cutter-bar having a helical flange and helical cutter-sections detachably mounted on said flange, each of said sections formed with hooked teeth projecting from one margin thereof.

Signed by me at Ottumwa, Iowa, this 19th day of March, 1903.

CLARK J. SMITH.

Witnesses:
W. A. WORK,
HELEN LOTSPEICH.